United States Patent [19]

Honda

[11] 4,383,053
[45] May 10, 1983

[54] ANTIFOULING PAINTS HAVING FUMARIC ACID ESTER POLYMER

[75] Inventor: Yoshihiro Honda, Nishinomiya, Japan

[73] Assignee: Nippon Oil and Fats Co., Ltd., Tokyo, Japan

[21] Appl. No.: 199,931

[22] PCT Filed: Aug. 15, 1979

[86] PCT No.: PCT/JP79/00215
§ 371 Date: May 7, 1980
§ 102(e) Date: Apr. 28, 1980

[87] PCT Pub. No.: WO80/00571
PCT Pub. Date: Apr. 3, 1980

[30] Foreign Application Priority Data

Sep. 7, 1978 [JP] Japan .................... 53-109108

[51] Int. Cl.³ ............... C09D 5/16; C08F 22/10; C08F 122/10; C08F 222/10
[52] U.S. Cl. ..................... 523/122; 526/321; 106/15.05
[58] Field of Search ............ 106/15 AF; 526/321; 523/122

[56] References Cited

U.S. PATENT DOCUMENTS

| | | | |
|---|---|---|---|
| 2,560,588 | 7/1951 | Munday et al. | 526/321 |
| 3,257,360 | 5/1966 | Slocombe | 526/321 |
| 4,221,839 | 9/1980 | de Graaf | 106/15.05 |
| 4,297,137 | 10/1981 | Sarhetto et al. | 106/15.05 |
| 4,314,850 | 2/1982 | Watanabe et al. | 106/15.05 |

FOREIGN PATENT DOCUMENTS 989998 5/1976 Canada ............... 106/15.05
49-20491 5/1974 Japan .

*Primary Examiner*—Joseph L. Schofer
*Assistant Examiner*—Peter F. Kulkosky
*Attorney, Agent, or Firm*—Parkhurst & Oliff

[57] ABSTRACT

Paint compositions to be used for preventing deposition of organisms on marine structures or fishingnets used in the sea contain, as a vehicle, polymers obtained by polymerizing at least one of the unsaturated acid ester monomers shown by the general formula $$R_1OOC-CX=CY-COOR_2$$

wherein $R_1$ and $R_2$ are alkyl groups having 1–4 carbon atoms, and X and Y are hydrogen, alkyl groups having 1 or 2 carbon atoms or halogen, or copolymerizing the unsaturated acid ester monomers having the above described formula with unsaturated monomers copolymerizable therewith. The coating film of the paint compositions has a high strength and a moderate solubility in sea water and exhibits a very high antifouling activity for a long period of time.

8 Claims, No Drawings

ANTIFOULING PAINTS HAVING FUMARIC ACID ESTER POLYMER

FIELD OF THE INVENTION

The present invention relates to antifouling paints using synthetic resin compositions having a high strength and a moderate water solubility in a coating film as a vehicle.

BACKGROUND ART

To marine structures, such as ships, bridges, tanks floating on the sea and the like, and marine fixed facilities, such as fish culturing nets, trap nets and the like, a large number of marine organisms, such as barnacles, tube worms, oysters, ascidians, Bryozoa, sea lettuce and green laver, deposit and cause great damage, such as corrosion of the structures, reducing of sailing speed of ships and death of a large number of fishes due to poor flowing of sea water resulting from clogging of meshes of the net. Therefore antifouling paints are generally used in order to prevent the attachment of troublesome marine organisms. However, the conventional antifouling paints have a short antifouling period said period, being only 12-16 months so that the antifouling paint must be coated again. Thus antifouling paints having a long period of activity have been demanded.

The antifouling paints are classified into two groups in view of the mechanism of the antifouling function.

One group is referred to as the "soluble matrix type". When the resin which is the vehicle or matrix is dissolved in sea water, an antifouling agent, such as cuprous oxide dispersed in the matrix is also dissolved off to maintain the concentration of the antifouling agent in sea water near the coating film at a concentration higher than the lethal dose for marine organisms, whereby the antifouling object can be attained. The other group is referred to as the "insoluble matrix type"; the matrix is formed of resins insoluble in sea water, such as vinyl chloride, chlorinated rubber, styrene-butadiene polymer and a component soluble in sea water, such as rosin. When this insoluble matrix type antifouling coating film is dipped in sea water, the rosin is dissolved off in sea water and simultaneously the antifouling agent dispersed in the matrix is dissolved off and the concentration of the antifouling agent in sea water near the coating film is maintained at a concentration higher than the lethal dose for marine organisms and the antifouling object can be attained.

In the former soluble matrix type, rosins or fatty acids form the matrix, but these substances have a high dissolution rate in sea water and the consumption of the coating film is severe, so that it is impossible to effect the antifouling for a long period of time; further, the matrix is of low molecular weight, so that the coating film is low in strength and is too soft and brittle and is difficult to use in a thick coating. Accordingly, the insoluble matrix type, wherein the resin insoluble in sea water is used as a coating film reinforcing agent, occupies the major part of the commercially available antifouling paints at present.

In the insoluble matrix type, the original dissolution rate of the antifouling agent into sea water is high, but when the section of the coating film dipped in sea water for a few months is observed by a microscope and analyzed, at the upper layer portion of the coating film, only the insoluble resin remains and the lower layer portion contains the insoluble resin, rosin and the antifouling agent, and maintains the same state as the state prior to the dipping. In such a state, the insoluble resin residue in the matrix of the upper layer portion prevents the dissolution of antifouling agent and rosin and the rate of the antifouling agent dissolved off gradually lowers. When 12-16 months pass after the dipping, even though a sufficient amount of antifouling agent remains in the lower layer portion, the rate at which the antifouling agent dissolves off lowers and the dissolution becomes insufficient and the concentration becomes less than the lethal dose for marine organisms and the organisms start depositing.

As mentioned above, the dissolution rate is too high in the soluble matrix type, and the thick coating is difficult; in the insoluble matrix type, a long period of antifouling is impossible due to the insoluble resin residue, so that both types are incapable of preventing fouling for a long period of time.

From the above described points, a soluble matrix type antifouling paint which can provide the antifouling property for a long period of time, the coating film of which has a high strength, and which is moderately soluble in sea water and can be coated in a thin layer, is most desirable.

As inventions having such an intention, mention is made of Japanese Patent Application Publication No. 21,426/65, No. 9,579/69 and No. 12,049/76, which disclose antifouling paints.

In these inventions, polymers obtained either by homomopolymerizing an organotin compound monomer having the general formula

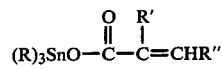

or copolymerizing said monomer with other unsaturated compounds, form the matrix. When the antifouling paint contacts sea water, a hydrolytic decomposition reaction occurs to separate the matrix into the organotin compound of the antifouling agent and a polymer containing a carboxyl group. This polymer is dissolved in sea water and therefore this antifouling paint is classified in the soluble matrix group.

However, synthesis of the organotin compounds having an unsaturated group is difficult, their storage stability is poor and they tend to increase in viscosity, and they are dissolved in sea water owing to hydrolysis, so that the polymers are sensitive to the pH of sea water and the dissolution rate varies depending upon the sea area.

Accordingly, as the process which provides the solubility to the polymer of the matrix without utilizing a hydrolytic decomposition mechanism, consideration has been given to introduction of hydrophilic groups, such as free carboxyl groups or hydroxyl groups into the polymer. However, these hydrophilic groups are apt to react with metallic antifouling agents, such as cuprous oxide, tributyltin compounds, triphenyltin compounds and the like, at room temperature and a cross-linking reaction occurs in a vessel to cause gelation and the desired use becomes impossible.

DISCLOSURE OF THE INVENTION

The inventors have made studies diligently for solving the above described problems and have succeeded in obtaining polymers to form a soluble matrix having none of above described drawbacks.

In the present invention, water solubility is obtained without including a free carboxyl group or hydroxyl group, and the antifouling paint of the present invention is characterized in that the vehicle comprises polymers obtained by polymerizing at least one of the unsaturated acid ester monomers shown by the following general formula

$$R_1OOC—CX=CY—COOR_2 \quad (A)$$

wherein $R_1$ and $R_2$ are alkyl groups having 1–4 carbon atoms, and X and Y are hydrogen atom, alkyl groups having 1 or 2 carbon atoms or halogen atoms, or copolymerizing the unsaturated acid ester monomers having the general formula (A) with copolymerizable unsaturated monomers.

The unsaturated acid ester monomers shown by the formula (A) have two hydrophilic ester groups based on one ethylene group, as compared with compounds such as acrylate, methacrylate, ethylene, butadiene, styrene and the like, so that the polymers containing the unsaturated acid ester monomers shown by the formula (A) presumably become soluble matrix type vehicles having moderate or slight solubility.

The coating film composed of an antifouling paint obtained by dispersing thus obtained polymers together with color pigment, body pigment, antifouling agent, solvent and the like becomes a soluble matrix mechanism and has a strength which has not been possessed by the conventional soluble matrix type antifouling paint composed of a low molecular weight compound, such as rosin, and can be thickly coated. In the insoluble matrix type, the rate at which the antifouling agent is dissolved off, which is most important, is too high at the original stage and the dissolution rate gradually lowers. The coating film formed of the antifouling paint of the present invention on the other hand, is not excessively dissolved off at the original stage, and the moderate dissolution rate is stable kept, so that while the coating film remains, the dissolution rate does not substantially lower. Accordingly, if the coating film is thick, the antifouling period can be prolonged. For example, if 150μ of coating is applied as the dry coating film thickness, even though 36 months elapse, the antifouling activity is very high and the antifouling period of the coating film may be more than three times the antifouling period of a coating film of the insoluble matrix type antifouling paint which has the same dry thickness of 150μ.

Furthermore, the organotin compound polymer of the prior art which becomes the soluble matrix type through hydrolysis are sensitive to pH variation of sea water, and the polymers which are moderately dissolved off at a pH of 8.2 dissolve very slowly at a pH of less than 8.0. The coating film composed of the antifouling paint of the present invention is not substantially influenced by pH value and maintains a stable dissolution rate and therefore is most desirable as an antifouling paint for ships which sail sea zones having different pH values at various places in the world.

The unsaturated acid ester monomers to be used in the present invention and shown by the formula (A) include cis-isomers and trans-isomers. As the cis-isomers, mention may be made of dimethyl maleate, diethyl maleate, methyl ethyl maleate, dimethyl α-chloromaleate, methyl ethyl α-chloromaleate, diethyl α-chloromaleate, dimethyl α,β-dichloromaleate, methyl ethyl α,β-dichloromaleate, diethyl α,β-dichloromaleate, dimethyl α-methylmaleate, methyl ethyl α-methylmaleate, diethyl α-methylmaleate, dimethyl α,β-dimethylmaleate, methyl ethyl α,β-dimethylmaleate, diethyl α,β-dimethylmaleate, dimethyl α-chloro-β-methylmaleate, methyl ethyl α-chloro-β-methylmaleate, diethyl α-chloro-β-methylmaleate, dimethyl α-ethylmaleate, methyl ethyl α-ethylmaleate, diethyl α-ethylmaleate, dimethyl α-,β-diethylmaleate, methyl ethyl α-,β-diethylmaleate, diethyl α-,β-diethylmaleate, dimethyl α-chloro-β-ethylmaleate, methyl ethyl α-chloro-β-ethylmaleate, diethyl α-chloro-β-ethylmaleate and the like. As the trans isomers, mention may be made of dimethyl fumarate, methyl ethyl fumarate, diethyl fumarate, dimethyl α-chlorofumarate, methyl ethyl α-chlorofumarate, diethyl α-chlorofumarate, dimethyl α-,β-dichlorofumarate, methyl ethyl α-,β-dichlorofumarate, diethyl α-,β-dichlorofumarate, dimethyl α-methylfumarate, methyl ethyl α-methylfumarate, diethyl α-methylfumarate, dimethyl α-,β-dimethylfumarate, methyl ethyl α-,β-dimethylfumarate, diethyl α-,β-dimethylfumarate, dimethyl α-chloro-β-methylfumarate, methyl ethyl α-chloro-β-methylfumarate, diethyl α-chloro-β-methylfumarate, dimethyl α-ethylfumarate, methyl ethyl α-ethylfumarate, diethyl α-ethylfumarate, dimethyl α-,β-diethylfumarate, methyl ethyl α-,β-diethylfumarate, diethyl α-,β-diethylfumarate, dimethyl α-chloro-β-ethylfumarate, methyl ethyl α-chloro-β-ethylfumarate, diethyl α-chloro-β-ethylfumarate and the like. The polymers obtained by polymerizing at least one of the above described monomers or copolymerizing the unsaturated acid ester monomers shown by the formula (A) with an unsaturated monomer copolymerizable therewith are used as the vehicle.

The unsaturated monomers copolymerizable with the unsaturated acid ester monomers shown by the formula (A) include ethylenically unsaturated monomers not containing free carboxyl groups or hydroxyl groups, for example, acrylates, methacrylates, crotonates, itaconates, acrylamide, acrylonitrile, ethylene, vinyl chloride, vinyl acetate, vinylidene chloride, methyl vinyl ether, butadiene, cyclohexene, styrene, vinyl toluene, α-methylstyrene, chlorostyrene and the like. In the copolymerization with the unsaturated acid ester monomers shown by formula (A), in general, if the proportion of the unsaturated comonomers increases, the water solubility of the resin decreases and the antifouling activity tends to lower. However, in the case of methyl acrylate, methyl methacrylate, ethyl methacrylate, vinyl acetate and the like, there is not such a tendency and even if a fairly large amount of these comonomers is compounded, a good coating film formability is provided and resins having high antifouling activity can be obtained.

The polymerization can be carried out by any one of solution polymerization, emulsion polymerization, suspension polymerization and bulk polymerization in the presence of a vinyl polymerization catalyst, but in the case of using a varnish for paint, solution polymerization or emulsion polymerization is convenient.

The smaller the average molecular weight (average weight) of the polymers, the higher is the rate at which the polymer dissolves in sea water is; but with a molecular weight of less than 1,000, the dissolution rate is too high, and when the molecular weight exceeds 100,000, the dissolution rate is too low, so that the usable range of the molecular weight is 1,000–100,000, but 1,000–50,000 is preferable.

Furthermore, the dissolution rate varies depending upon the kinds and compounding amounts of the unsaturated acid ester monomers and the unsaturated comonomers to be used, and the dissolution rate of the polymers can be easily varied by varying the average molecular weight and the composition of the monomers.

The obtained polymers alone comprise the vehicle, but publicly known dissolving assistants, such as rosins, fatty acids and the like, may be used with the polymers. In addition, previously known oil varnishes, and resin solutions, such as chlorinated rubbers, vinyl chloride, styrene-butadiene, acryl resins and the like, may be used together; but since these resins have no solubility, they must be used in such an amount that the solubility of the polymers of the present invention is not damaged.

As the antifouling agents to be used for the antifouling paint of the present invention, use may be made of cuprous oxide, tributyltin compounds, triphenyltin compounds, thiuram compounds and all the conventional known antifouling agents, Furthermore, conventional known pigments and additives may be used.

The antifouling paint of the present invention can be prepared by any of the known processes.

BEST MODE OF CARRYING OUT THE INVENTION

The following examples are given for the purpose of illustration of this invention and are not intended as limitations thereof. The "part" used in the examples means "by weight", the viscosity is the value measured at 25° C. and the molecular weight shows the average molecular weight measured by the GPC process.

PREPARATION EXAMPLE 1

To a flask equipped with a stirrer, 40 parts of xylene and 40 part of ethylene glycol monoethyl ether were charged and the mixture was heated to 80° C. Then a mixed solution of 48 parts of dimethyl maleate, 24 parts of vinyl acetate, 18 parts of methyl methacrylate, 12 parts of ethyl acrylate and 1.5 parts of benzoyl peroxide was added dropwise thereto while stirring over 3 hours. After having finished the adding, the mixture was heated to 100° C. and stirred at the same temperature for 3 hours to complete the polymerization reaction. Then 20 parts of xylene was added to the reaction mixture and the resulting mixture was cooled to obtain a solution A.

The obtained solution A was a clear polymer solution having a viscosity of 1.5 poises and the molecular weight of the resin was 16,000.

PREPARATION EXAMPLE 2

To a flask equipped with a stirrer, 76 parts of diethyl maleate, 24 parts of vinyl acetate, 180 parts of water, 5 parts of nonionic surfactant, 1 part of potassium persulfate, and 1 part of dodecyl mercaptane were charged, and the resulting mixture was subjected to emulsion polymerization at 50° C. for 10 hours while stirring to obtain a solution B.

The resulting solution B was white and had a viscosity of 0.5 poise, and the molecular weight of the resin was 12,000.

PREPARATION EXAMPLE 3

To a flask equipped with a stirrer, 36 parts of dimethyl α,β-dichlorofumarate, 24 parts of diethyl maleate, 18 parts of vinyl acetate, 12 parts of ethyl acrylate, 10 parts of butyl acrylate, 1 part of azobisisobutyronitrile, 60 parts of ethylene glycol monoethyl ether and 40 parts of xylene were charged. The resulting mixture was left to stand at room temperature for 30 minutes and then heated to 100° C. while stirring and the polymerization reaction was carried out at said temperature for 9 hours to obtain a solution C.

The obtained solution C was clear and had a viscosity of 13 poises, and the molecular weight of the resin was 36,000.

PREPARATION EXAMPLE 4

To a flask equipped with a stirrer, 50 parts of ethylene glycol monoethyl ether, 70 parts of dimethyl fumarate and 30 parts of vinyl acetate were charged. The resulting mixture was heated to 80° C. and then a mixed solution of 50 parts of ethylene glycol monoethyl ether, 8 parts of benzoyl peroxide and 3 parts of dodecyl mercaptane was added dropwise thereto while stirring over 3 hours. After having finished the addition, the temperature was raised to 100° C. and the stirring was continued at the same temperature for 3 hours to complete the polymerization reaction to obtain a solution D.

The obtained solution D was clear and had a viscosity of 0.8 poise and the molecular weight of the resin was 4,600.

PREPARATION EXAMPLE 5

To a flask equipped with a stirrer, 40 parts of methyl ethyl maleate, 20 parts of diethyl fumarate, 20 parts of butyl acrylate, 20 parts of acryl amide, 4 parts of benzoyl peroxide, 40 parts of xylene and 60 parts of ethylene glycol monoethyl ether were charged. The temperature was raised to 120° C. while stirring and the polymerization was carried out at the same temperature for 6 hours to obtain a solution E.

The obtained solution E was clear and had a viscosity of 1.2 poises and the molecular weight of the resin was 7,800.

PREPARATION EXAMPLE 6

To a flask equipped with a stirrer, 40 parts of ethylene glycol monoethyl ether, 20 parts of methyl isobutyl ketone and 20 parts of xylene were charged. The resulting mixture was heated to 110° C. and then a mixed solution of 40 parts of diethyl α-chloromaleate, 40 parts of methyl ethyl fumarate, 20 parts of butyl methacrylate and 10 parts of t-butyl peroxy 2-ethyl hexanoate was added dropwise thereto over 2 hours while stirring. The mixture was then continuously stirred at the same temperature for 3 hours to complete the polymerization reaction, whereby a solution F was obtained.

The obtained solution F was clear and had a viscosity of 0.5 poise and the molecular weight of the resin was 1,600.

PREPARATION EXAMPLE 7

To a flask equipped with a stirrer was charged 50 parts of methyl isobutyl ketone. The temperature was raised to 100° C. and then a mixed solution of 40 parts of diethyl α,β-diethylfumarate, 20 parts of diethyl fumarate, 20 parts of methyl methacrylate, 10 parts of ethyl acrylate, 10 parts of 2-ethylhexyl acrylate and 6 parts of benzoyl peroxide was added dropwise thereto over 3 hours while stirring. After the addition, the mixture was heated to 120° C. and the polymerization was continued at the same temperature for 3 hours, after which 50 parts of xylene and 1 part of benzoyl peroxide were added dropwise thereto to complete the polymerization reaction, whereby a solution G was obtained.

The obtained solution G was clear and had a viscosity of 1 poise and the molecular weight of the resin was 3,300.

PREPARATION EXAMPLE 8

To a flask equipped with a stirrer, a mixed solution of 100 parts of butyl acetate, 40 parts of diethyl α-methylfumarate, 25 parts of dimethyl α-bromomaleate, 35 parts of diethyl maleate and 3 parts of azobisisobutyronitrile was charged. The resulting mixture was subjected to the polymerization reaction at 65° C. for 15 hours while stirring to obtain a solution H.

The obtained solution H was clear and had a viscosity of 3.2 poises and the molecular weight of the resin was 21,000.

EXAMPLES 1-8, COMPARATIVE EXAMPLES 1 and 2

Formation of paint:

By using the polymer solutions A-H obtained in Preparation Examples 1-8, kneading and dispersing were conducted upon the paint compositions shown in the following Table 1 to prepare the antifouling paints of Examples 1-8.

Preparation of painted test plates:

The antifouling paints of Examples 1-8, a soluble matrix type antifouling paint (Comparative Example 1), and an insoluble matrix type antifouling paint (Comparative Example 2), which are the typical commercially available comparative paints, were applied twice with a brush on coated plates obtained by previously coating an anticorrosive paint on sand blast treated steel sheets, so as to obtain a dry coating film having a thickness of 150μ and to prepare test plates for determining the antifouling activity. In the same manner as described above, test plates for measuring the dissolution rate of the antifouling agent, on which the antifouling paints are coated only in a given area of 10 cm × 20 cm, were prepared.

Dipping test:

The test plates for determining the antifouling activity and the test plates for measuring the dissolution rate were dipped in sea water at Yura Bay, Sumoto City, Hyogo Prefecture, Japan, for 36 months.

Results of the dipping test:

In the dipping test, the test result of the antifouling activity is shown in Table 2, the result of measurement of the dissolution rate of copper is shown in Table 3, and the result of measurement of dissolution rate of tin is shown in Table 4.

In general, the antifouling lower limit concentration of the respective antifouling agent in sea water has been referred to be 10 $\gamma/cm^2/day$ as copper in copper compound and 1 $\gamma/cm^2/day$ as tin in tin compound.

TABLE 1(a)

| Used material | Paint Composition (Unit: wt. %) | | | | | | | | | |
|---|---|---|---|---|---|---|---|---|---|---|
| | Example | | | | | | | | Comparative Example | |
| | 1 | 2 | 3 | 4 | 5 | 6 | 7 | 8 | 1 | 2 |
| Polymer solution A | 40 | | | | | | | | | |
| Polymer solution B | | 67 | | | | | | | | |
| Polymer solution C | | | 40 | | | | | | | |
| Polymer solution D | | | | 30 | | | | | | |
| Polymer solution E | | | | | 20 | | | | | |
| Polymer solution F | | | | | | 33 | | | | |
| Polymer solution G | | | | | | | 40 | | | |
| Polymer solution H | | | | | | | | 35 | | |
| Rosin WW | | | | | 9 | | | | 21 | 8 |
| Vinyl chloride resin (VYHH) | | | | 5 | | | | | | 8 |
| Linseed oil | | | | | | | | | 10 | |
| Dioctyl phthalate | | | | | | | | | | 3 |
| Cuprous oxide | 30 | | 40 | 30 | 20 | 50 | 30 | 45 | 35 | 35 |
| Triphenyltin hydroxide | 5 | | | | | | | | | 5 |
| Triphenyltin fluoride | | 10 | | | | | | | | |
| Tributyltin fluoride | | | | | | 5 | 5 | 15 | | |
| Tributyltin chloride | | | | | | 5 | | | | |
| Zinc dimethyldithiocarbamate | | | | 5 | | | | | | |
| Dichlorodiphenyltrichloroethane | | | | | 5 | | | | | |
| Talc | 5 | | 5 | | 8 | | 5 | 5 | | |
| Red oxide | 5 | 5 | 5 | | 10 | | | | 5 | 10 |
| Zinc white | 5 | | | | | | | | | |
| Organic bentonite | 1 | | | | | | | | | |

TABLE 1(b)

| Used material | Paint Composition (Unit: wt. %) | | | | | | | | | |
|---|---|---|---|---|---|---|---|---|---|---|
| | Example | | | | | | | | Comparative Example | |
| | 1 | 2 | 3 | 4 | 5 | 6 | 7 | 8 | 1 | 2 |
| Disparlon 4300* | | | 2 | 2 | 1 | 2 | 1 | 1 | | 1 |
| Xylene | 9 | | 8 | 6 | 22 | 10 | 6 | 9 | 19 | 5 |
| Methyl isobutyl ketone | | | | 10 | | | 8 | | | 19 |
| Isopropanol | | | | 2 | | | | | | |
| Toluene | | | | 10 | | | | | | 16 |
| Water | | 13 | | | | | | | | |
| Total | 100 | 100 | 100 | 100 | 100 | 100 | 100 | 100 | 100 | 100 |

Note:
*Additive for anti-sagging agent, trademark, made by Kusumoto Kasei Co., Ltd.
VYHH: Vinyl chloride-vinyl acetate copolymer resin

TABLE 2

| | Antifouling activity (shown by percentage of area of organisms deposited) | | | | | | | | | | |
|---|---|---|---|---|---|---|---|---|---|---|---|
| | Dipped month | | | | | | | | | | |
| | 3 | 6 | 9 | 12 | 15 | 18 | 24 | 27 | 30 | 33 | 36 |
| Example 1 | 0 | 0 | 0 | 0 | 0 | 0 | 0 | 0 | 0 | 0 | 0 |

TABLE 2-continued

Antifouling activity
(shown by percentage of area of organisms deposited)

| | Dipped month | | | | | | | | | | |
|---|---|---|---|---|---|---|---|---|---|---|---|
| | 3 | 6 | 9 | 12 | 15 | 18 | 24 | 27 | 30 | 33 | 36 |
| Example 2 | 0 | 0 | 0 | 0 | 0 | 0 | 0 | 0 | 0 | 0 | 0 |
| Example 3 | 0 | 0 | 0 | 0 | 0 | 0 | 0 | 0 | 0 | 0 | 0 |
| Example 4 | 0 | 0 | 0 | 0 | 0 | 0 | 0 | 0 | 0 | 0 | 0 |
| Example 5 | 0 | 0 | 0 | 0 | 0 | 0 | 0 | 0 | 0 | 0 | 0 |
| Example 6 | 0 | 0 | 0 | 0 | 0 | 0 | 0 | 0 | 0 | 0 | 0 |
| Example 7 | 0 | 0 | 0 | 0 | 0 | 0 | 0 | 0 | 0 | 0 | 0 |
| Example 8 | 0 | 0 | 0 | 0 | 0 | 0 | 0 | 0 | 0 | 0 | 0 |
| Comparative Example 1 | 0 | 0 | 0 | 10 | 50 | 100 | 100 | 100 | 100 | 100 | 100 |
| Comparative Example 2 | 0 | 0 | 0 | 3 | 10 | 100 | 100 | 100 | 100 | 100 | 100 |

TABLE 3

Rate of copper dissolved off
(shown by $\gamma/cm^2/day$)

| | Dipped month | | | | | | | | |
|---|---|---|---|---|---|---|---|---|---|
| | Start | 0.5 | 1 | 2 | 3 | 6 | 12 | 24 | 36 |
| Example 1 | 31 | 20 | 16 | 19 | 16 | 17 | 15 | 15 | 12 |
| Example 3 | 35 | 26 | 13 | 14 | 15 | 15 | 18 | 12 | 14 |
| Example 4 | 37 | 24 | 20 | 20 | 18 | 21 | 16 | 13 | 13 |
| Example 5 | 21 | 17 | 15 | 18 | 13 | 12 | 11 | 12 | 10 |
| Example 6 | 40 | 28 | 22 | 24 | 20 | 21 | 23 | 20 | 21 |
| Example 7 | 25 | 16 | 12 | 11 | 11 | 13 | 13 | 12 | 10 |
| Example 8 | 32 | 15 | 13 | 15 | 11 | 15 | 15 | 14 | 12 |
| Comparative Example 1 | 44 | 47 | 53 | 35 | 18 | 11 | 6 | *0 | *0 |
| Comparative Example 2 | 73 | 51 | 32 | 25 | 19 | 16 | 7 | *0 | *0 |

Note:
*Measurement is infeasible, because organisms deposit, so that the result is shown by 0.

TABLE 4

Rate of tin dissolved off
(shown by $\gamma/cm^2/day$)

| | Dipped month | | | | | | | | |
|---|---|---|---|---|---|---|---|---|---|
| | Start | 0.5 | 1 | 2 | 3 | 6 | 12 | 24 | 36 |
| Example 1 | 2.1 | 1.2 | 1.0 | 1.1 | 1.0 | 1.0 | 1.0 | 1.1 | 0.8 |
| Example 2 | 2.3 | 1.5 | 1.2 | 1.1 | 1.0 | 1.2 | 1.1 | 1.0 | 1.0 |
| Example 5 | 3.6 | 2.8 | 2.1 | 1.9 | 2.4 | 2.2 | 2.2 | 2.1 | 2.3 |
| Example 6 | 3.1 | 1.7 | 1.5 | 1.4 | 1.2 | 1.5 | 1.6 | 1.5 | 1.5 |
| Example 7 | 4.8 | 3.1 | 3.0 | 2.8 | 2.6 | 3.1 | 3.3 | 3.2 | 3.0 |
| Comparative Example 2 | 4.3 | 2.6 | 1.7 | 1.3 | 1.0 | 0.8 | 0.6 | *0 | *0 |

Note:
*Measurement is infeasible, because organisms deposit, so that the result is shown by 0.

Concerning the antifouling activity test in Table 2, in Examples 1–8, the amount of organisms deposited after 36 months is 0%, but in Comparative Examples 1 and 2, the deposit of organisms is observed after 12 months, and all surfaces of the test plates are deposited with organisms after 18 months.

Concerning the rate of copper dissolved off in sea water shown in Table 3, the rate in all the Examples does not become lower than the lower antifouling limit concentration even after 36 months, but the rate in the Comparative Examples becomes lower than the lower antifouling limit concentration after 12 months.

Concerning the rate of tin dissolved off in sea water shown in Table 4, among the rates in the Examples, the rate only in Example 1 becomes lower than the lower antifouling limit concentration after 36 months, but in the Comparative Examples, the rate of tin dissolved off becomes lower than the lower antifouling limit concentration in 6 months.

Physical property test of the coating film:
By using the antifouling paints of Examples 1–8 and Comparative Examples 1 and 2, the physical properties of the coating film were compared. The test results are shown in Table 5.

TABLE 5

| | Physical properties | |
|---|---|---|
| | Impact resistance*[1] | Flexibility*[2] |
| Example 1 | Pass | Pass |
| Example 2 | Pass | Pass |
| Example 3 | Pass | Pass |
| Example 4 | Pass | Pass |
| Example 5 | Pass | Pass |
| Example 6 | Pass | Pass |
| Example 7 | Pass | Pass |
| Example 8 | Pass | Pass |
| Comparative Example 1 | Not pass | Not pass |
| Comparative Example 2 | Not pass | Pass |

Note:
*[1] JIS K5400 6.13.3
*[2] JIS K5400 6.15 core diameter 2 mm

All samples in Examples 1–8 passed through both the test of impact resistance and of flexibility, but both the samples of the Comparative Examples do not pass the impact resistance test, and only the sample of Comparative Example 2 passes the flexibility test.

As seen from the above described results of the test of the coating film properties and the test of dipping in sea water, the coating film obtained from the antifouling paint of the present invention has a high strength and a moderate solubility in sea water and a very long antifouling period.

I claim:

1. Antifouling paints containing as a vehicle polymers having a weight average molecular weight of 1,000–100,000 obtained by polymerizing at least one of the unsaturated acid ester monomers shown by the general formula $$R_1OOC-CX=CY-COOR_2$$

wherein $R_1$ and $R_2$ are alkyl groups having 1–4 carbon atoms, and X and Y are hydrogen, alkyl groups having 1 or 2 carbon atoms, or halogen, or by copolymerizing a major amount of the unsaturated acid ester monomers having the said formula with ethylenically unsaturated monomers free of free carboxyl and hydroxyl groups.

2. Antifouling paints as claimed in claim 1, wherein the unsaturated acid ester monomers shown by the formula are cis isomers.

3. Antifouling paints as claimed in claim 1, wherein the unsaturated acid ester monomers shown by the formula are trans isomers.

4. Antifouling paints as claimed in claim 1, 2 or 3, wherein each of $R_1$ and $R_2$ in the formula is a methyl group or an ethyl group.

5. Antifouling paints as claimed in claim 1, 2, or 3, wherein X and Y in the formula are hydrogen atoms.

6. Antifouling paints as claimed in claim 1, 2 or 3, wherein at least one of X and Y in the formula is a methyl group.

7. Antifouling paints as claimed in claim 1, 2 or 3, wherein at least one of X and Y in the formula is a chlorine atom.

8. Antifouling paints as claimed in claim 1, 2 or 3, wherein the unsaturated monomers copolymerizable with the unsaturated acid ester monomers having the said formula are ethylenically unsaturated monomers not containing free carboxyl groups or hydroxyl groups.

* * * * *